United States Patent [19]
Cole

[11]  4,410,760
[45]  Oct. 18, 1983

[54] MEANS FOR SUPPORTING A BUS BAR IN SWITCHBOARD HOUSING APPARATUS

[75] Inventor: David B. Cole, Ballwin, Mo.

[73] Assignee: GTE Products Corporation, Stamford, Conn.

[21] Appl. No.: 395,184

[22] Filed: Jul. 6, 1982

Related U.S. Application Data

[62] Division of Ser. No. 219,551, Dec. 23, 1980, Pat. No. 4,366,528.

[51] Int. Cl.³ ............................................. H01B 17/18
[52] U.S. Cl. ..................................... 174/171; 361/361
[58] Field of Search ................. 174/68 B, 70 B, 71 B, 174/149 R, 149 B, 158 R, 165, 171; 361/355, 361

[56] References Cited

U.S. PATENT DOCUMENTS 1,078,368  11/1913  Meusebach ..................... 174/149 R
3,180,922  4/1965  Gallant et al. ................... 174/171 X

FOREIGN PATENT DOCUMENTS 558670  3/1957  Italy .................................... 174/165

*Primary Examiner*—Laramie E. Askin
*Attorney, Agent, or Firm*—Fred Fisher

[57] ABSTRACT

Switchboard apparatus includes means for supporting a bus bar including an elongated steel member having at least one bolt hole therethrough, the steel member being coated with an insulative material. A pair of formed washers of protective material are adapted to seat within the hole at opposite sides of the steel member. A member bolt fits within the washers and the hole, and a nut is adapted to engage with the bolt with a flat washer fitting between the bolt and one of the formed washers.

5 Claims, 3 Drawing Figures

MEANS FOR SUPPORTING A BUS BAR IN SWITCHBOARD HOUSING APPARATUS

CROSS-REFERENCE TO RELATED APPLICATIONS

This is a division of application Ser. No. 219,551, filed Dec. 23, 1980, now U.S. Pat. No. 4,366,528, entitled "Switchboard Housing Apparatus", issued Dec. 28, 1982.

Other divisional applications of U.S. Pat. No. 4,366,528, filed concurrently with this application, include applications Ser. Nos. 395,180; 395,185; and 395,186.

BACKGROUND OF THE INVENTION

1. Field of the Invention

This invention relates to new and improved means for supporting a bus bar in switchboard housing apparatus. Accordingly, it is a general object of this invention to provide new and improved means of such character.

2. Description of the Prior Art

In the past, insulative supports were used to support a plurality of bus bars.

SUMMARY OF THE INVENTION

Another object of this invention is to provide a new and improved switchboard housing utilizing a bus bar support which is stronger and less expensive than bus bar supports of the prior art.

In accordance with an embodiment of the invention, means for supporting a bus bar in a switchboard housing apparatus includes an elongated steel member having at least one bolt hole therethrough, the member being coated with an insulative material. A first formed washer of insulative material is adapted to seat within the hole at one side of the member. A second formed washer of insulative material is adapted to seat within the hole at a side opposite to the first side of the member. A metal bolt is adapted to fit within the washers in the hole. A nut is adapted to engage within the bolt, and a flat washer is adapted to fit between the nut and the second washer. In accordance with certain features of the invention, the steel member insulative material is epoxy. The insulative material of one of the washers can be fiber, and it can be plastic. The protective material of one of the formed washers is a material selected from the group consisting of tin, lead, and other conductive malleable material that is softer than the insulative material coating on the member.

BRIEF DESCRIPTION OF THE DRAWINGS

Other objects, advantages and features of this invention, together with its construction and mode of operation, will become more apparent from the following description, when read in conjunction with the accompanying drawing, in which.

DESCRIPTION OF PREFERRED EMBODIMENTS

Various aspects of the switchboard housing apparatus are fully discussed in the aforesaid U.S. Pat. No. 4,366,528.

Figure 1:
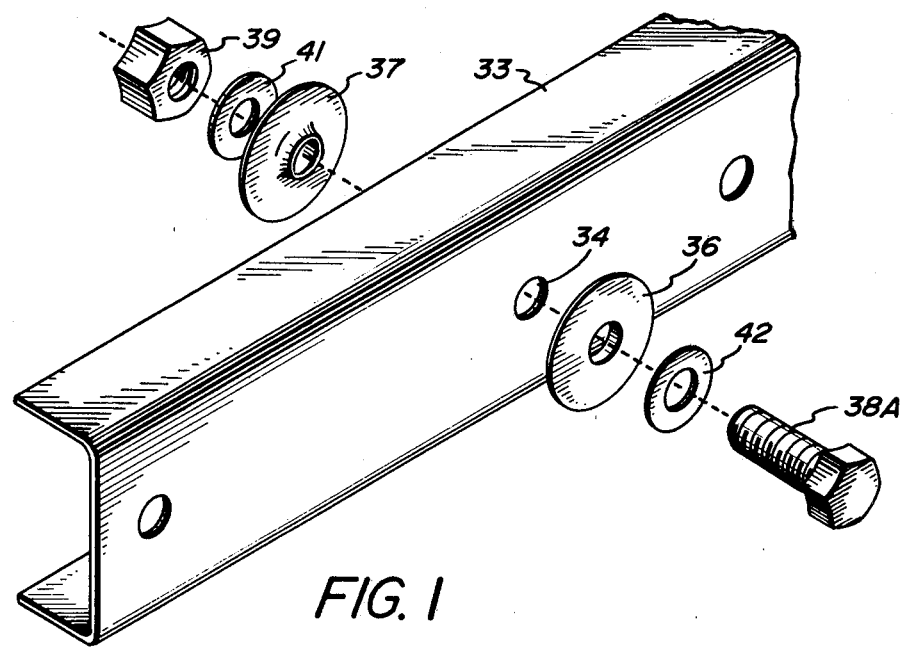
FIG. 1 is an exploded view illustrating one embodiment of this invention.
Figure 2:
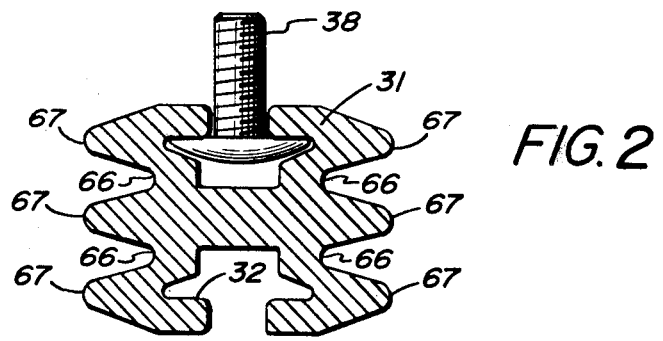
FIG. 2 is a drawing illustrating a cross-section view of a distribution bus bar and an engaging carriage bolt helpful for an understanding of how the bus bar support means of FIGS. 1 and 3 are utilized.
Figure 3:
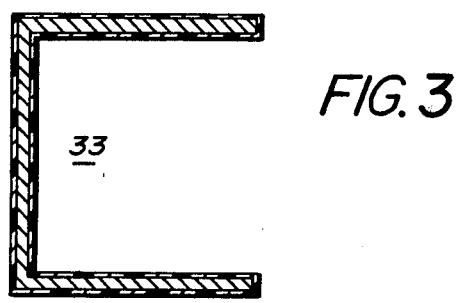
FIG. 3 is a cross-sectional view of the channel shown in FIG. 1.

One aspect of the invention in the switchboard housing apparatus is directed to means for supporting a bus bar. Referring to FIG. 2, a bus bar 31, which is conductive and can be formed of metal, has one or more grooves 32 therewithin for supporting a screw or a bolt.

The bus bar also may be provided with grooves 66 and ridges 67 to enhance cooling thereof. A support for such a bus bar includes an epoxy coated steel channel 33. The steel channel 33 can be coated with any other type of insulative material, including other plastics; however, epoxy is desired. The epoxy coated steel channel 33 is formed with at least one bolt hole 34 therethrough. A first formed washer 36 of insulative material is adapted to seat within the hole 34 at one side of the member 33. A second formed washer 37 of insulative material is adapted to seat within the hole 34 at the opposite side of the member 33. The washers, primarily, provide mechanical protection to the epoxy from abrasion or cutting by the hardware to the bus bar. A metal carriage bolt or screw 38 is adapted to fit within the washers 36, 37 and the hole 34 of the member 33. A nut 39 engages with the thread on the bolt 38, and the flat washer 41 is adapted to fit between the nut 39 and the washer 37 so that, upon tightening of the nut 39, the formed fiber washer 37 ensures that the epoxy on the channel 33 is not damaged. Optionally, a separate flat washer 42 and hexagon headed bolt 38A can be used in lieu of a carriage bolt 38. The washers 36 and 37, which are formed of resilient material that can conform to the epoxy coated surface of the bus bar, can be formed of fiber or plastic, as desired. In essence, this aspect of the invention involves using a fabricated steel support 33 that is coated with epoxy or other suitable insulative material and bolted by means of a bolt or a screw 38 to a distribution bus bar 31 and a central column of a switchboard housing assembly.

At the mounting points at the various holes 34 within the steel channel 33, both for the bus bar 31 and support columns, washers 36, 37 of fiber or plastic are utilized that protect the epoxy from damage either on the surface, or inside the hole 34 when bolted into place.

In accordance with this invention, a steel support is used. Steel is used because it is stronger and less expensive than plastic. However, because steel is a conductor, steel is coated with a plastic. Protective washers are utilized to avoid damage to the insulative coating on the channel 33. Protective washers are used throughout with every connection so that the insulative coating is maintained intact at all mounting points, requiring dual failure of the protective washers and the coating before a short circuit occurs. The plastic coating provides for electrical isolation. The plastic washers provide for mechanical protection. Otherwise, steel washers, impinged by the tightening of nuts, dig into the plastic and short circuit the equipment.

In the absence of an insulating plastic for coating the steel support, it would be necessary that there would be a one inch minimum air gap to avoid arcing for safety reasons. Such a gap is presently required by Underwriters Laboratories. However, a one inch spacing is not required in the absence of an air gap. For example, with a plastic as an insulator, one needs only 0.020 inch thickness as an insulation, thereby avoiding the necessity of the one inch space. Hence, with the foregoing invention, space is reduced by utilizing insulating material in lieu of air about the steel support.

The steel can be coated with an epoxy applied by fluidized bed process known in the art. That is, the steel is heated and placed in a bed of air bubbling epoxy. The heated steel is rocked back and forth within this bed of bubbling epoxy (which is a bubbling dry powder). The powder adheres to the steel, melts, solidifies and cures. By way of example, the epoxy becomes 0.020 inch thick, the fiber washers can be 1.5 inches in diameter, 0.030 inch thick. The hole in the center is large enough to take a ⅜ inch bolt. The washer can be formed to a minimum of 1/32 inch deflection inwards toward the hole of the metal support.

The benefits of the foregoing aspects of this invention include:

1. The compact strength and economy of using metal instead of solid dielectric provides a better short circuit withstand resistance for a bus system than conventional methods.
2. The double insulation provided by the insulation at the ground mounting point with a column member, and the live mounting point with the bus bar 31 or between adjacent bus bars, with the added benefit of the fiber or plastic washers 36, 37, in effect, defines that a double failure of the insulation must occur before failure of the system. In the unlikely event of a bus bar 31 overheating to the degree that insulation was totally destroyed on one bus support 33 position, the steel core within the epoxy-coated steel channel 33 would continue to hold the damaged element in place, rather than collapsing and spreading the fault as is possible with conventional systems.

Other modifications will suggest themselves to those skilled in the art to which this invention pertains without departing from the spirit and scope of this invention.

What is claimed is:

1. In a switchboard housing apparatus, means for supporting a bus bar comprising
   an elongated steel member having at least one bolt hole therethrough, said member being coated with an insulative material;
   a first formed washer of protective material adapted to seat within said hole at one side of said member;
   a second formed washer of protective material adapted to seat within said hole at a side opposite to said one side of said member;
   a metal bolt adapted to fit within said washers and said hole;
   a nut adapted to engage with said bolt; and
   a flat washer adapted to fit between said nut and said second formed washer.
2. The means for supporting a bus bar as recited in claim 1 wherein said steel member insulative material is epoxy.
3. The means for supporting a bus bar as recited in claim 1 wherein said protective material of one of said formed washers is fiber.
4. The means for supporting a bus bar as recited in claim 1 wherein said protective material of one of said formed washers is plastic.
5. The means for supporting a bus bar as recited in claim 1 wherein said protective material of one of said formed washers is a material selected from the group consisting of tin, lead, and other conductive malleable material that is softer than said insulative material coating on said member.

* * * * *